May 19, 1970          J. D. DUNBAR          3,512,244
METHOD OF MANUFACTURING BELLOWS
Filed May 31, 1968
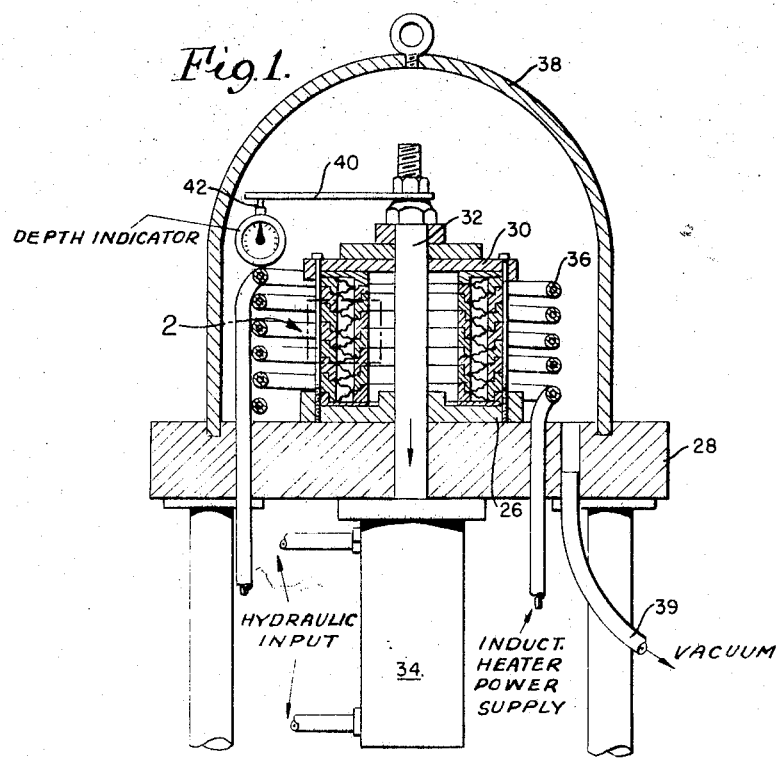
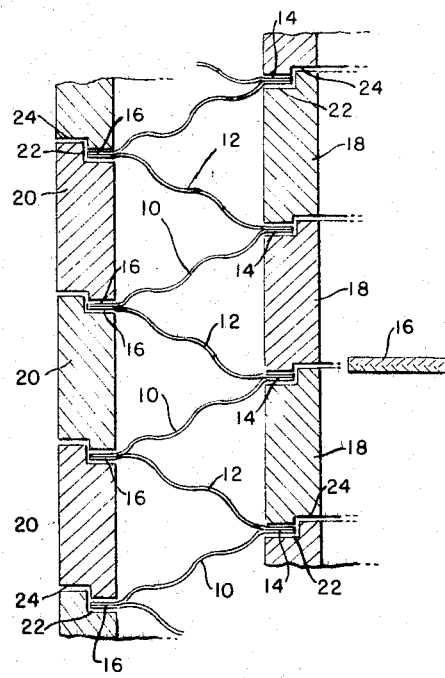
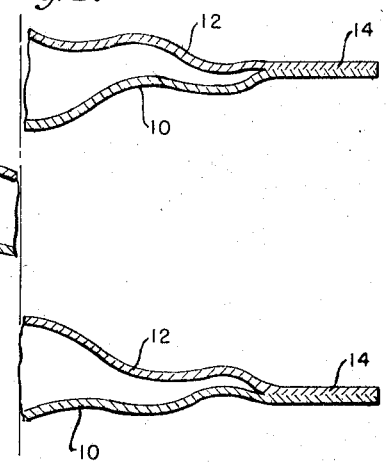
INVENTOR.
JACK D. DUNBAR
BY
*Bean & Bean*
ATTORNEYS

United States Patent Office 3,512,244
Patented May 19, 1970

---

3,512,244
METHOD OF MANUFACTURING BELLOWS
Jack D. Dunbar, Lewiston, N.Y., assignor to Bell Aerospace Corporation, Wheatfield, N.Y.
Filed May 31, 1968, Ser. No. 733,612
Int. Cl. B23p *19/04;* B23k *19/00;* C21d *7/14*
U.S. Cl. 29—454                                    3 Claims

---

ABSTRACT OF THE DISCLOSURE

An improved flexible metal bellows adapted to a variety of uses; for example, as a positive expulsion diaphragm in space vehicle fuel tanks; a packless expansion joint seal for conduits; a piston-cylinder seal; and the like; and an improved method for manufacturing same. The invention provides an improved production economy and product integrity by metallurgically producing a one-piece bellows assembly by employment of a solid-state joining operation in lieu of conventional fluid state welding methods. In accordance with the present invention a stack of ring-shaped components are simultaneously joined by a diffusion bonding process under certain critical conditions of environment, pressure and temperature, into a succession of convolutions; thereby providing a flexible bellows fabrication of improved performance capabilities.

---

BACKGROUND OF THE INVENTION

It is currently recognized in various industries, and specifically in connection with current aerospace programs, that welded joints in flight vehicle hardware and the like are unreliable. Hence, bellows devices fabricated by method such as set forth by way of example in U.S. Pats. 1,717,196 and 3,140,327 are no longer acceptable; and it is a primary object of the present invention to provide an improved method for manufacturing a bellows device as aforesaid whereby the device will meet the stringent requirements of such industries.

Briefly stated, the present invention contemplates fabrication of a bellows device by diffusion-bonding together a series of annular components formed of stainless steel, titanium, or the like; said components having only congruently lapped and mating flange surfaces thereof diffusion-bonded together. The bonding is accomplished by a heat-press operation in a vacuum or inert gas atmosphere; resulting in an energetical molecular migration across the mating interfaces, whereby the interfaces lose identity. The applied pressure and thermal expansion of the component parts operate to optimize the surface mating efficiency and promote molecular migration, resulting in grain growth over the entire interface areas. The solid state diffusion bonding effects so produced are the result of migrations of atoms and crystal growths across faying surfaces of the metal parts, when placed in vacuum at elevated temperatures and under high pressures. Optimum diffusion bonding effects are of course obtained by pre-cleaning the mating surfaces and avoidance of oxidation and/or carbonization thereof, as will be explained more fully hereinafter.

By way of example the invention is described hereinafter and illustrated by the accompanying drawing, wherein:

THE DRAWING

FIG. 1 is a vertical sectional view through a fixture such as may be used in carrying out the method of the invention, showing a bellows structure being assembled therein;

FIG. 2 is an enlarged scale fragmentary sectional view corresponding to the portion of FIG. 1 which is encircled and designated by numeral 2; and FIG. 3 is a composite fragmentary sectional view on a greatly enlarged scale of flange portions of the bellows structure.

EXHIBIT

Exhibit A is a microphotograph of a joint between elements 10 and 12 (to be retained in the file).

DETAILED DESCRIPTION

The invention contemplates a novel method for manufacturing flexible metal bellows; and particularly applies to the fabrication of such bellows from certain metals which are considered difficult to weld; such as stainless steel, commercially pure titanium, or the like. As best shown at FIGS. 1, 2 of the drawing herewith, the method of the present invention involves the erection within a jig device in vertically stacked and alternately disposed relation a plurality of washer shaped convolute components 10–12 which are formed of stainless spring steel or titanium, or the like. The components 10 are generally frusto-concave shaped in plan view, while the components 12 are generally frusto-convex in plan view. All of the component members are formed with horizontally disposed inner and outer edge flange portions 14, 16 respectively.

The component members are inner and outer diameter dimensioned so that when they are arranged in vertically stacked relation as best shown in FIG. 2, the corresponding flange portions 14, 16 thereof meet in congruent lapped relation. As shown at FIGS. 1, 2, inner and outer spacer rings 18, 20 are interposed in stacked relation between alternate pairs of the flange portions 14 and 16 of the component members; and the spacer rings 18, 20 are annularly stepped at their upper and lower surfaces as indicated at 22, 24, respectively. It is prerequisite that the mating flange surfaces of the washer components 10–12 be clean and free of dirt, oil, grease or any other foreign matter, as well as being free from oxidation. Furthermore, in order to prevent interim surface contaminations such as by outgassing from the washer components and/or the spacers or other tooling devices, such as is frequently encountered under increased temperature conditions, it is desirable to maintain certain vacuum and/or partial gas pressure levels throughout the operational environment.

To complete the fabrication of the bellows of the invention a vertical stack comprising inner and outer spacer rings 18, 20, and annular components 10–12 assembled as shown in FIG. 1 may be placed upon a jig plate 26 such as is supported upon a stationary platen 28 comprising part of a heat-press assembly. The movable plate of the press in indicated at 30 and is arranged to be pulled downwardly by means of a piston rod 32 extending into a hydraulic cylinder 34. Any suitable means for heating the assembly prior to the pressing operation may be employed, such as an induction heating power supply element which, as illustrated at 36, is helically shaped to encompass the stack of workpieces. The entire assembly is then enclosed within a vacuum-tight bell as indicated at 38; a conduit 39 being connected to the interior of the bell for communication with a vacuum pump or inert gas supply or the like (not shown). To provide the process attendant with suitable supervision of the operation a laterally extending strut as indicated at 40 is provided on the press rod 32. The parts are so arranged that the strut 40 will operate to depress the actuating finger 42 of a depth gauge 44; thereby providing a visual reading of the depth of compaction of the stack of spacer and component parts during the heat processing operation.

The method of the present invention is particularly suitable for fabricating a bellows structure of metals of the so called difficult-to-weld types, such as for example type 347 stainless steel; commercially pure titanium; TD nickel; or the like. In accordance with the invention convolutes of such metals may be efficiently diffusion-welded together at their peripheral flange portions as explained hereinabove, while the major body portions thereof remain in "solid state" phase; thereby avoiding undesirable shape distortion and/or structural deterioration effects. Selection of a suitable material for the spacer ring devices 18, 20 is of course a critical prerequisite for successful operation of the invention. Type 1010 steel has proven to be a suitable material for this purpose; meeting the compressive strength requirements at the operational temperatures. Also it is economical to machine into the requisite shapes, and is subsequently acid-leachable without adverse effects on the bellows forming components. Such type steels may be effectively surface-cleaned by a chemical wash and/or mechanical and/or ultrasonic cleaning methods.

In summary, the invention contemplates a production operation sequence including; (a) blanking and forming the convolute washer members 10-12; (b) lathe-turning the spacers 18-20 from steel tubing stock; (c) surface-cleaning the washer components and spacers and environmental tooling; (d) assembling the stack of components and spacers as explained hereinabove; (e) subjecting the assembly to a diffusion bonding procedure; (f) cooling down the assembly while it is remaining in the vacuum or inert gas atmosphere; and finally (g) removing the assembly from the vacuum chambers and the jig and acid-leaching away the spacer ring devices.

To minimize and/or eliminate carbon pickup in the convolute members, as from the spacer rings or the environmental tooling, it is contemplated that the spacer rings will preferably be plated or otherwise coated with some suitable "stop-off" material. Alternatively, foil-like shims of some suitable insulating sacrificial material may be disposed between the spacer rings and the convolute members. In any case it will of course be appreciated that employment of the diffusion bonding technique as contemplated herein will operate to maintain the original metallurgical dispersion and performance characteristics of the metal of the convolute components. For example, such components may typically have been prehardened and spring-tempered. The solid-state bonding technique of the present invention avoids any substantial degree of as-cast structure modification and/or solid-solution recrystallization, such as inevitably accompanies conventional fluid-state welding operations.

By way of example, production specimens fabricated in accordance with the invention have been successively produced in accordance with the test report as follows:

Bellows ring material: type 347 stainless steel
Spacer tooling material: type 1010 steel
Test package: seven convolutions
Operating conditions:
    Vacuum: $5 \times 10^{-4}$ (minimum) torr
    Pressure: 3000 p.s.i.
    Temperature: 1600° F.
Cycling sequence:
    (1) Thirty minute specimen outgassing at 1000° F.
    (2) Pressure of 3000 p.s.i. applied.
    (3) Electric power supply increased for controlled heat up to 1600° F.
    (4) Vacuum minimum level maintained or improved.
    (5) Specimen cooling to 700° F. in vacuum.
    (6) Removed and naturally cooled on aluminum plate and in water.
Results: Examination revealed successful bonding of inner and outer circumferential areas.

Thus, it will be appreciated that the solid state bonding technique as used in the method of the present invention provides not only an improved production economy but also an improved product of metallurgical integrity. The bellows structure as made by the process of the present invention features an economical yet uniform metallurgical bonding together of the convolute components all around the adjoined surfaces thereof whereby a leak-proof bellows is assured. An appreciation of the invention may be gained for example by considering the exigencies involved in fabricating a typical space vehicle "expulsion" type fuel tank having a capacity of say 2.5 gallons. The "expulsion" bellows component of such a tank would typically have a diameter dimension in the order of 13.5 inches, and an overall length (when expanded) of the order of 27.5 inches. The convolute components would be of thickness of the order of .005 inch; and approximately 90 of such components would be required to make up the structural assembly of the device. This means that in order to weld together the alternately cojoining inner and outer edge portions of the members as by means of a conventional welding process a total of approximately 700 feet of lineal welding must be meticulously performed in order to fabricate a satisfactory (leak-proof) device. The inevitable vagaries of lineal welding processes invariably involve such fabrication systems in inordinate fail-test and "scrap" losses, while in any case being also disadvantageous because of the time and expense involved; whereas the present invention requires only that the critical temperature and pressure and atmosphere and parts-cleanliness requirements be met, whereupon the entire assembly is quickly and uniformly bonded together; thereby economically producing a superior product. Whereas, the prior art lineal welding methods require the use of highly skilled technicians and sophisticated equipment (albeit the results are unpredictable) the structural components, in the case of the present invention may be inexpensively stamped out and relatively stacked by unskilled labor and then bonded together by a readily controllable "single-shot" process.

It is to be noted that the convolute members 10-12 are preferably annularly corrugated, thereby providing them the requisite flexibility to accommodate alternate expansion-contraction of the bellows device. Also, as shown in the drawing herewith at FIGS. 2, 3, the corrugations of adjacent convolutes are arranged so as to precisely nest together when the bellows is contracted. This arrangement is particularly useful when the bellows is to be employed for example as an expulsion "bladder" in a space vehicle fuel tank. Obviously, in such cases, it is of prime importance to provide for maximum volumetric expulsion of the fuel tank contents, when and as needed; and the bellows device as shown herein embodies that capability. It is of course also to be understood that although only a few specific forms of tooling and material components have been illustrated and described hereinabove, various modifications may be made therein without departing from the spirit of the invention and/or the scope of the following claims.

I claim:
1. A method for producing a unitary metallic bellows comprising the steps of:
    forming pluralities of washer shaped convolute members of the material prescribed for the bellows structure,
    forming pluralities of paired inner and outer spacer rings so that the rings of each pair respectively have inner and outer diameters commensurate with the inner and outer diameters of said convolute members,
    surface cleaning said convolute members and said spacer rings,
    assembling a stack of said convolute members in vertically congruent relationship while disposing inner and outer spacer rings alternately between the lapped inner and outer edge portions of said convolute members, subjecting the assembly to an ambient inert atmosphere condition, heating the assembly to a material diffusion welding temperature and then pressing the lapped edge portions of said convolute members together between said spacer rings until the edge portions of said members are solid-state diffusion-bonded together, cooling the assembly and removing the pressure thereon while maintaining the inert atmosphere until the integrated convolute assembly is cooled below material oxidation temperature, removing the assembly from the inert atmosphere, and then acid-leaching away the spacer rings, thereby providing a metallurgically unitary metallic bellows device.

2. A method for producing a unitary metallic bellows as set forth in claim 1 wherein said convolute members are alternately of frusto-concave and frusto-convex form margined at their inner and outer edges by flat annular flange portions.

3. A method for producing a unitary metallic bellows as set forth in claim 1 wherein said spacer rings are coated with a stop-off material preventing carbon gassing of said rings and/or carbon pickup by said convolute members.

References Cited

UNITED STATES PATENTS

| | | | |
|---|---|---|---|
| 1,717,196 | 6/1929 | Emmet | 29—454 |
| 2,154,273 | 4/1939 | Kollsman | 29—454 |
| 2,279,854 | 4/1942 | Whitney | 29—454 X |
| 2,534,123 | 12/1950 | Hasselhorn | 148—127 X |
| 2,534,124 | 12/1950 | Hasselhorn | 29—454 X |
| 2,569,058 | 9/1951 | Hobbs | 148—127 |
| 2,788,302 | 4/1957 | Dew | 148—127 X |
| 2,818,636 | 1/1958 | Fentress | 29—454 |
| 2,822,194 | 2/1958 | Fentress | 29—454 X |
| 2,965,961 | 12/1960 | Schindzer | 29—454 |
| 3,025,592 | 3/1962 | Fischer | 29—486 X |
| 3,040,426 | 6/1962 | Hamren | 29—454 X |
| 3,140,327 | 7/1964 | Dettmer | 29—454 X |
| 3,153,846 | 10/1964 | Lindberg | 29—454 X |
| 3,202,552 | 8/1965 | Thexton | 148—127 |
| 3,233,632 | 2/1966 | Voitik | 29—454 X |
| 3,241,230 | 3/1966 | Batista | 29—494 |
| 3,262,196 | 7/1966 | Davis | 29—494 X |

WAYNE A. MORSE, Jr., Primary Examiner

U.S. Cl. X.R.

29—458, 470.9, 472.1, 486, 487, 494; 148—127